US006515850B2

(12) United States Patent
Fournier et al.

(10) Patent No.: US 6,515,850 B2
(45) Date of Patent: Feb. 4, 2003

(54) MODULE COMBINED WITH AN ELECTROMAGNETIC SWITCH APPLIANCE

(75) Inventors: Bernard Fournier, Le Plessis Bouchard (FR); Xavier Person, Vertus (FR); Jean-Marc Romillon, Longnes (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 09/897,104

(22) Filed: Jul. 3, 2001

(65) Prior Publication Data

US 2002/0030413 A1 Mar. 14, 2002

(30) Foreign Application Priority Data

Jul. 3, 2000 (FR) ........................................... 00 08648

(51) Int. Cl.[7] .................................................. H02B 1/01

(52) U.S. Cl. ......................... 361/627; 361/600; 336/60; 200/306

(58) Field of Search .......................... 218/157; 200/306, 200/307; 335/202; 336/60; 307/116, 147; 361/600, 627

(56) References Cited

U.S. PATENT DOCUMENTS

| | | | | |
|---|---|---|---|---|
| 3,328,553 A | | 6/1967 | Gryctko | 200/168 |
| 5,870,277 A | | 2/1999 | Girard et al. | 361/627 |
| 6,037,555 A | * | 3/2000 | Castonguay et al. | 200/306 |
| 6,147,419 A | * | 11/2000 | Girard | 200/307 |

FOREIGN PATENT DOCUMENTS

| | | |
|---|---|---|
| DE | 27 19 053 | 11/1977 |
| EP | 0 102 867 | 3/1984 |
| EP | 0 335 823 | 10/1989 |
| FR | 2 704 352 | 10/1994 |
| FR | 2 758 903 | 7/1998 |

* cited by examiner

*Primary Examiner*—Shawn Riley
(74) *Attorney, Agent, or Firm*—Parkhurst & Wendel, L.L.P.

(57) ABSTRACT

The present invention relates to a power supply control module for loads or motors, which is mounted as an addition under a main electromagnetic switch appliance (Ap) and having, in a casing (1), current paths with commutating poles controlled by an electromagnet control device and substantially characterized by the fact that it includes at the rear, means (21, 22, 23, 31, 32) capable of channelling gases flowing out of the breaker chambers of the main appliance (Ap).

7 Claims, 3 Drawing Sheets

MODULE COMBINED WITH AN ELECTROMAGNETIC SWITCH APPLIANCE

BACKGROUND OF INVENTION

The present invention relates to an electric power supply control module for loads or motors which are mounted as an addition under a main electromagnetic switch appliance and having in a casing, current paths with commutating poles controlled by an electromagnet control device, as well as means capable of receiving and channelling gases flowing out of the breaker chambers of the main appliance.

DISCUSSION OF BACKGROUND

It is known how to combine two contactors in order to achieve inversion of the running direction of the motor.

It is also known from document FR 2758903 how to combine a main appliance of the contactor or contactor-breaker type, with an inverting module having power supply commutating poles capable of providing inversion of the running direction of the motor.

When a module such as the inverting module above is directly mounted under the main electromagnetic switch appliance (contactor or contactor-breaker), the gases which flow out of the breaker chambers of this main appliance do not have sufficient outlet space between the main appliance and the module.

SUMMARY OF INVENTION

The object of the present invention is to provide a module combined with a main switch appliance able to provide discharge of the gases from this main appliance by channelling them, before discharging them downwards.

According to the invention, the module is characterized by the fact that the means for channelling the gases are housed between two boxes housing the commutating poles. According to one feature, the means for channelling the gases are positioned at the rear of a conductor directly connecting a supply terminal with an output terminal without passing through a commutating pole.

According to another feature, the means for channelling the gases are formed by a central channel delimited by two partitions and by side channels provided between a partition and a box.

According to a feature, the module includes a central vent opening onto the central channel and side vents opening onto the side channels.

BRIEF DESCRIPTION OF DRAWINGS

The invention will now be described in more detail with reference to exemplary embodiments and illustrated by the appended drawings wherein.

DETAILED DESCRIPTION OF INVENTION

Figure 1:
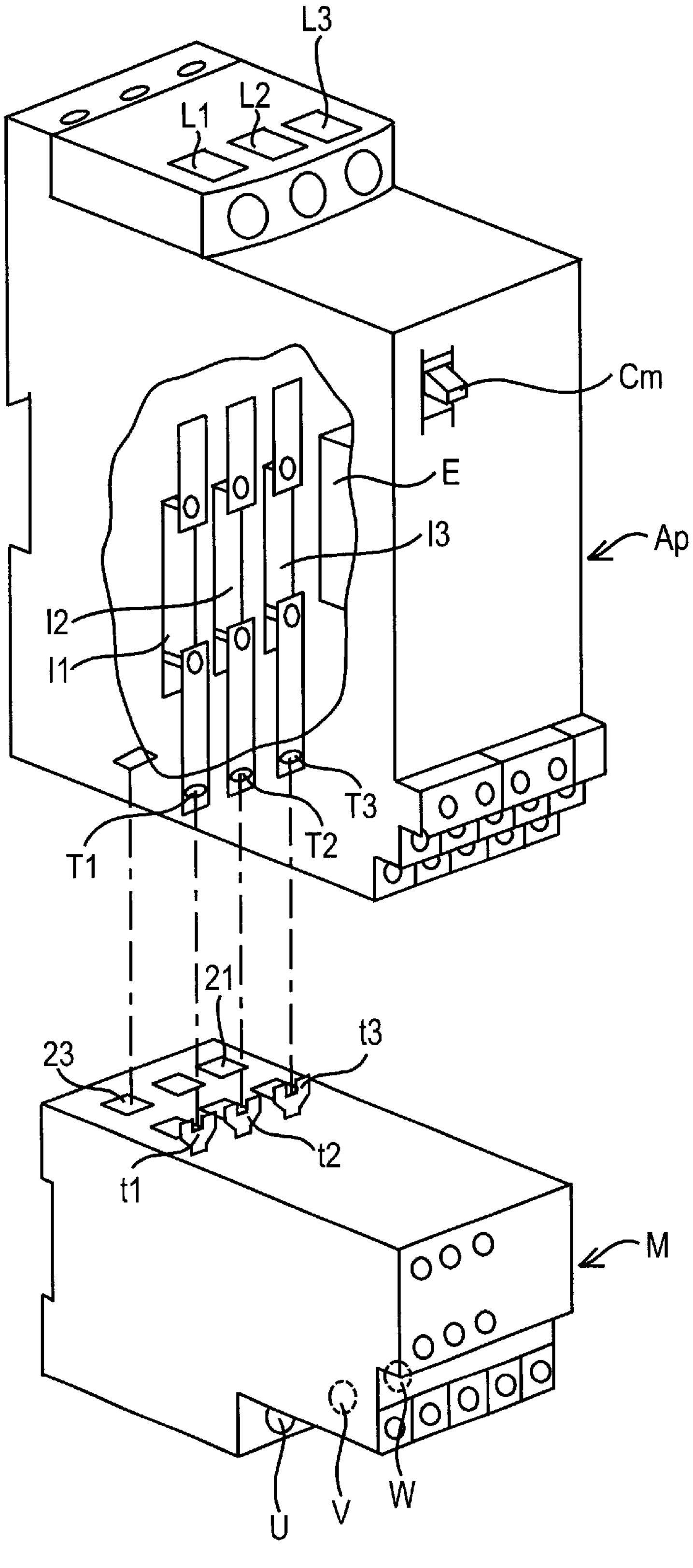
FIG. 1 is a diagram illustrating a main switch appliance combined with a module according to the invention.

The module according to the invention, marked out as M in its group of drawings, is combined with a multipolar electromagnetic switch appliance Ap of the contactor or contactor-breaker type.

The main electromagnetic switch appliance Ap houses, in a casing, current lines extending between the source terminals L1, L2, L3 which connect to the phases of the main AC supply and the load terminals t1, t2, t3. A breaker pole I1 or I2 or I3 controlled by an electromagnet E, the coil of which is supplied with electric current through two supply terminals, is positioned on each current line.

The main appliance Ap may have a motor protection function and includes a release device capable of opening the contacts of poles I1, I2, I3 when the intensity in a current line reveals a short circuit or an overload. Preferably it comprises a magnetic release sensitive to short circuit currents and a thermal release sensitive to overload currents and to phase unbalances. A manual control button Cms positioned on the front face is for opening the contacts voluntarily and resetting the appliance.

Module M which is combined with the main appliance Ap is the realization of a conventional motor control diagram such as: inversion of the running direction, star-delta starting, distribution, changing speed. This module has a casing 1 equipped at the rear with fixing means for fixing it onto a rail or a plate as well as power supply terminals t1, t2, t3 directly connected to the load terminals t1, t2, t3 of the main appliance Ap and motor output terminals such as U, V, W which are to be connected to the motor(s).

The module includes single and bistable contact-breaking commutating poles each positioned on a current line between a power supply terminal t1, t2, t3 and a motor output terminal. Each pole is formed by a contact holder 51 or 52 oscillating around an axis between the fixed contact parts 61, 62 connected by conductors realizing the motor control diagram at one motor output terminal. The contacts of a pole are always closed alternately except during the switchings. The mobile contact holders 51, 52 are moved by a commutating electromagnet combined with an electric or electronic control circuit.

Gases from the breaker chambers of the main appliance Ap are discharged under the casing of this main appliance, towards the top of module M. They enter this module M through vents 21, 22 and 23 located on the top and are channeled into gas confinement channels or chamber.

Figure 2:
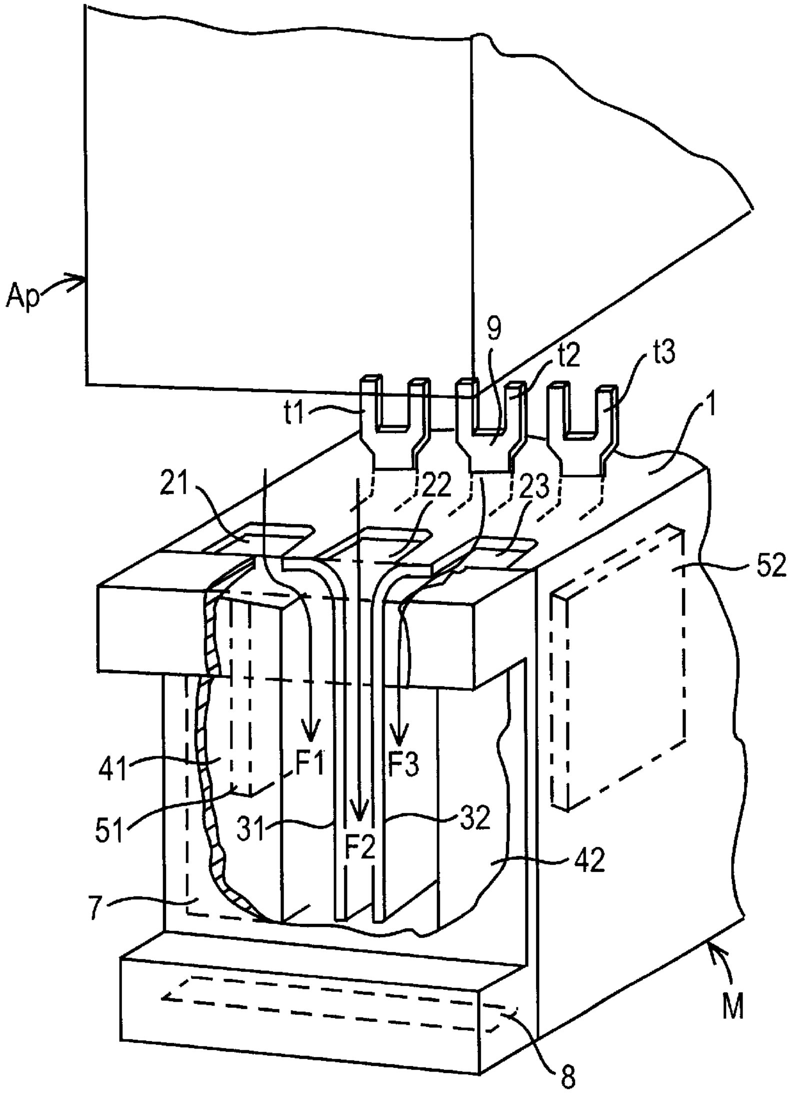
FIG. 2 is a view of the rear portion of an embodiment of the module according to the invention.
Figure 3:
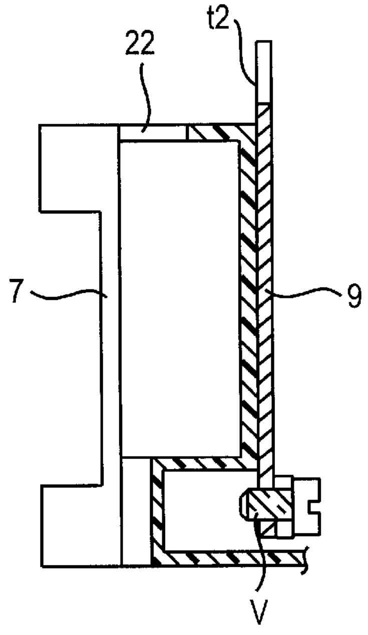
FIG. 3 is a vertical sectional view of the rear of the module of FIG. 2.

The embodiment of FIGS. 2 and 3 are for inverting the running direction. The central power supply terminal T2 is directly connected to the central motor output terminal V through a conductor 9 without any pole. The power supply terminals t1 and t3 are connected (running in direct motion) to two motor output terminals via the poles and after switching of these same poles (running in reverse motion) over to the inverted output terminals in order to achieve the usual crossing of the phases. The side poles 51 and 52 are housed in two boxes 41 and 42 housed in the casing.

The input vents 21, 22, 23 enable the gases to enter a chamber or a channel located at the rear and they are located on the top, at the rear, between terminals t1, t2, t3 and a rear partition 7 closing the module. The central vent 22 opens onto a central channel located between boxes 41 and 42 on the one hand, and between the central conductor 9 connecting terminal t2 to output terminal V and the rear partition 7, on the other hand. This channel is delimited by partitions 31 and 32. This housing of a central channel between two side poles is possible because of the absence of a central pole and the advanced position of conductor 9. The side vents 21 and 22 open onto side channels, one provided between partition 31 and box 41 and the other between partition 32 and box 42.

The gases flow in the confinement channels according to the flowing directions F1, F2, F3 and may escape downwards through an output vent 8.

Figure 4:
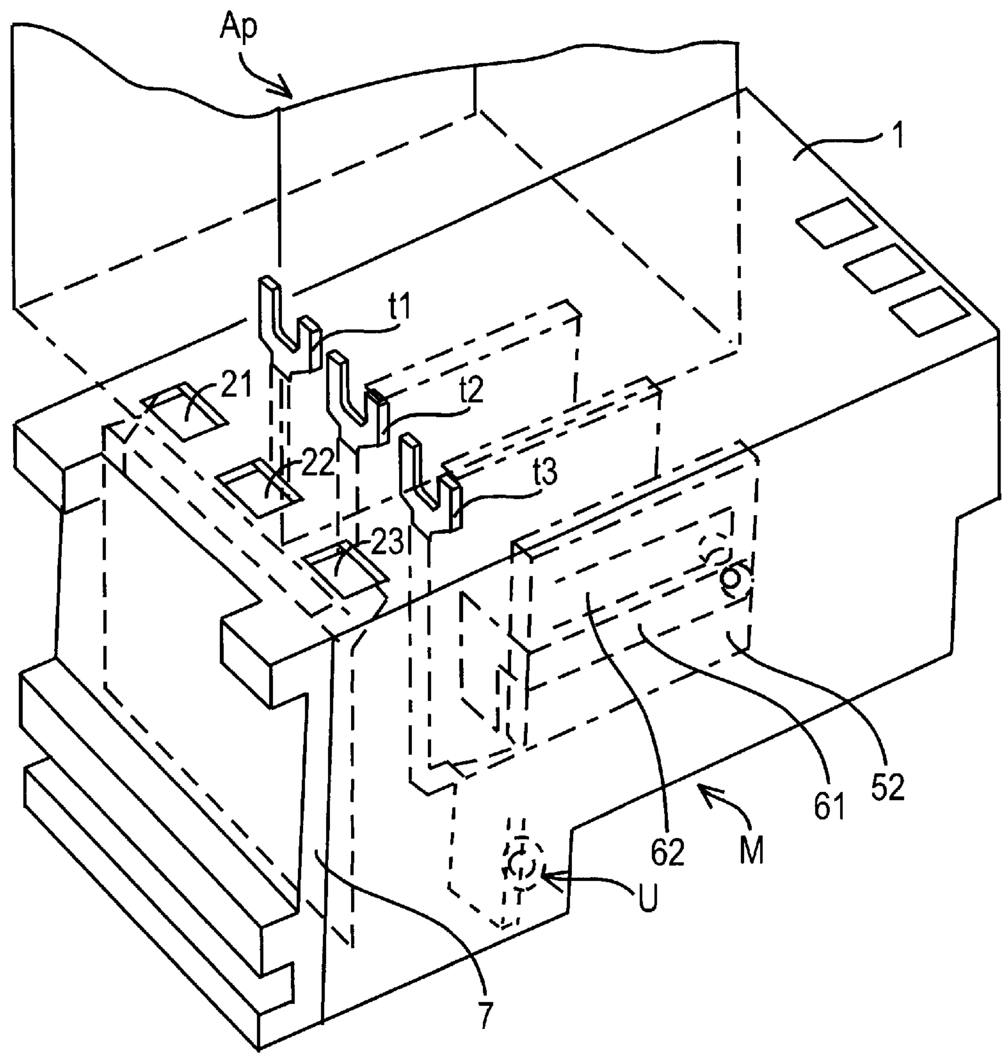
FIG. 4 is a view of the rear portion of a second embodiment of the module according to the invention.
Figure 5:
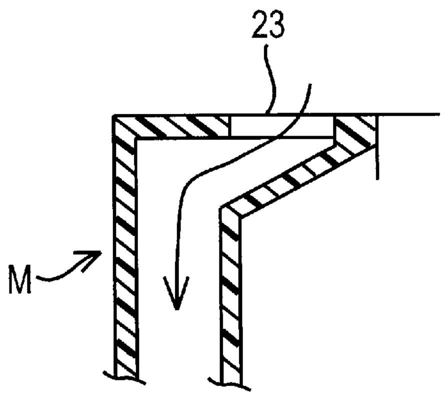
FIG. 5 is a vertical section of the rear of the module of FIG. 4.

The embodiment of FIGS. 4 and 5 includes three commutating poles. Vents 21, 22, 23 open onto the chambers or chimneys located at the rear. Because there is no central channel like in the embodiment of FIG. 2 and because the discharge of gases is achieved in chimneys or channels, at the same level, the module has a slightly larger depth than that of the module of FIG. 2.

It is understood that alternatives and detail enhancements may be devised without departing from the scope of the invention and the use of equivalent means may also be contemplated.

What is claimed is:

1. An electric supply control means for loads or motors which is mounted as an addition under a main electromagnetic switch appliance (Ap) and having, in a casing (1), current paths with commutating poles controlled by an electromagnet control device, as well as means (21, 22, 23, 31, 32, 7) for receiving and channelling gases flowing out of breaker chambers of the main appliance (Ap), characterized by the fact that the means (31, 32, 41, 42, 7) for channelling the gases are housed between two boxes (41, 42) housing commutating poles (51, 52).

2. The module according to claim 1, characterized by the fact that the means (31, 32, 41, 52, 7) for channelling the gases are positioned at the rear of a conductor (9) directly connecting a supply terminal (t2) with an output terminal (V) without passing through a commutating pole.

3. The module according to claim 1, characterized by the fact that the means (31, 32, 41, 52, 7) for channelling the gases are formed by a central channel delimited by two partitions (31, 32) and by side channels provided between a partition (31, 32) and a box (41, 42).

4. The module according to claim 1, characterized by the fact that it includes a central vent (22) opening onto the central channel (31, 32) and side vents (21, 23) opening onto side channels (31, 41, 32, 42).

5. The module according to claim 2, characterized by the fact that the channels are closed by a rear partition (7).

6. The module according to claim 2, characterized by the fact that it includes an output vent (8) for the gases.

7. The module according to claim 1, characterized by the fact that the commutating poles are each positioned on a current line between a power supply terminal and a motor output terminal and are formed by a contact holder (51 or 52) oscillating, under the action of a commutating electromagnet combined with an electrical or electronic control circuit, around an axis between the fixed contact parts (60, 62) connected through conductors which realize the motor control diagram.

* * * * *